Feb. 16, 1926. Re. 16,268

E. A. MELLINGER

TELEPHONE EXCHANGE AUTOMATIC SWITCHING SYSTEM

Original Filed Sept. 4, 1908 3 Sheets-Sheet 1

Inventor
Edward A. Mellinger
Chas. Th. Tandy Atty.

Feb. 16, 1926. Re. 16,268

E. A. MELLINGER

TELEPHONE EXCHANGE AUTOMATIC SWITCHING SYSTEM

Original Filed Sept. 4, 1908 3 Sheets-Sheet 2

Inventor
Edward A. Mellinger
Chas. Th. Candy Atty.

Feb. 16, 1926. Re. 16,268

E. A. MELLINGER

TELEPHONE EXCHANGE AUTOMATIC SWITCHING SYSTEM

Original Filed Sept. 4, 1908 3 Sheets-Sheet 3

Inventor
Edward A. Mellinger
Charles Candy Atty.

18

Reissued Feb. 16, 1926. Re. 16,268

UNITED STATES PATENT OFFICE.

EDWARD A. MELLINGER, OF CHICAGO, ILLINOIS, ASSIGNOR, BY MESNE ASSIGNMENTS, TO AUTOMATIC ELECTRIC INC., OF CHICAGO, ILLINOIS, A CORPORATION OF DELAWARE.

TELEPHONE-EXCHANGE AUTOMATIC SWITCHING SYSTEM.

Original application filed September 4, 1908, Serial No. 451,674. Renewed August 16, 1919, Serial No. 318,040. Original No. 1,343,462, dated June 15, 1920. Application for reissue filed June 12, 1922. Serial No. 567,821.

*To all whom it may concern:*

Be it known that I, EDWARD A. MELLINGER, a citizen of the United States of America, and resident of Chicago, Cook County, Illinois, have invented a certain new and useful Improvement in Telephone-Exchange Automatic Switching Systems, of which the following is a specification.

My invention relates to telephone systems in general, but more particularly to automatic or semi-automatic telephone exchange systems, and especially to systems that have no operating grounds at the substations, which are commonly called two-wire systems.

Objects of my invention are the provision of an improved non-numerical trunking switch—that is to say, a switch for automatically selecting idle trunks without reference to any digit of the called number; the provision of an improved master switch for controlling the operation of a plurality of said non-numerical trunking switches, whereby the latter select idle trunks ahead of the calls; the provision of an improved selector or numerical trunking switch for a two-wire system; the provision of an improved connector switch for finding the called line; and the provision of certain details and features of improvement and combinations tending to increase the general efficiency of a telephone system of this particular character.

To the foregoing and other useful ends my invention consists in matters hereinafter set forth and claimed.

Figure 1:
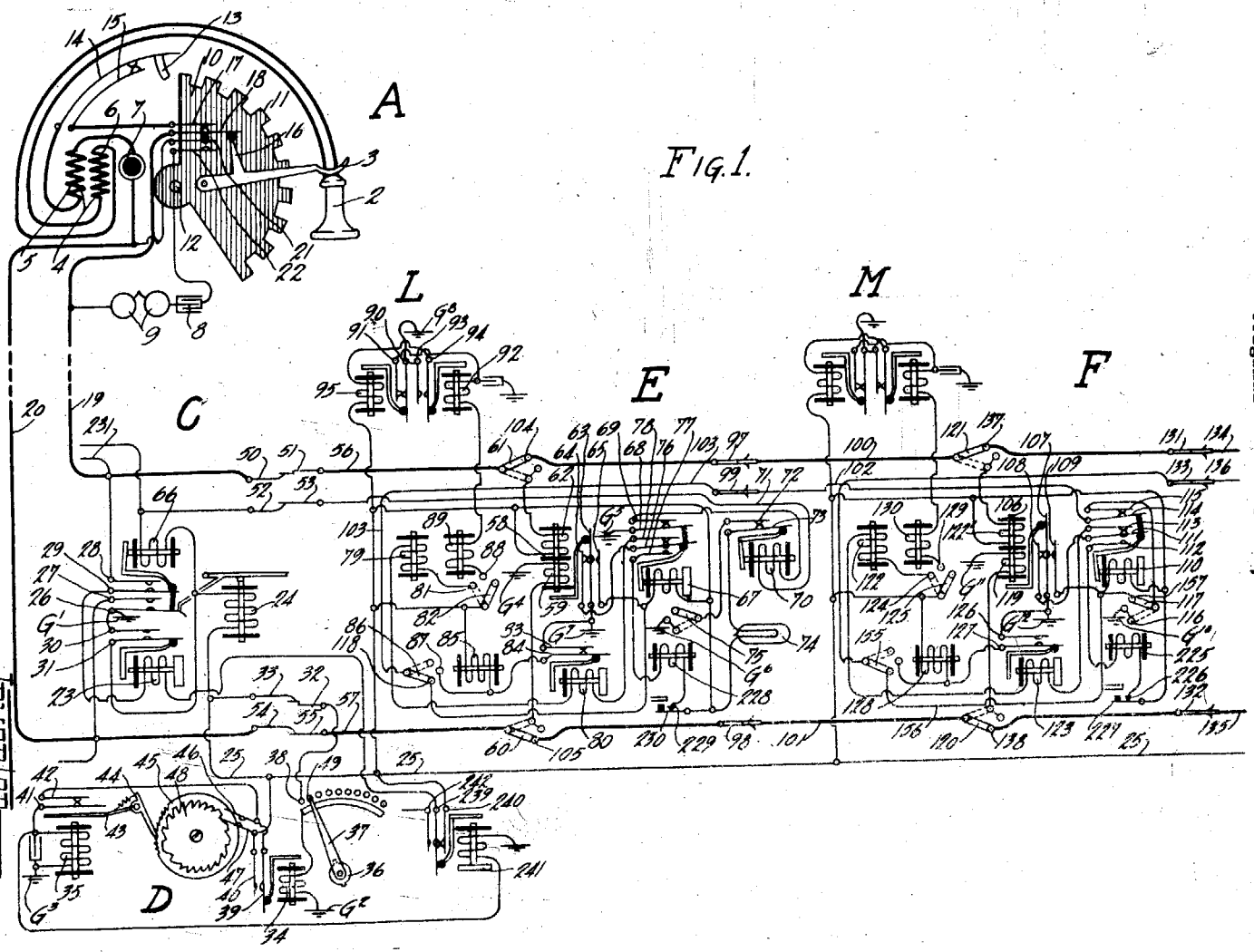

In the accompanying drawings Figure 1 shows diagrammatically the calling subscriber's substation A and the central office switching apparatus of a system involving the principles of my invention. To the line of substation A is allotted the line switch C controlled by the master switch D. At E is represented a first-selector switch, and at F a diagram of a second-selector switch is shown.

Figure 2:
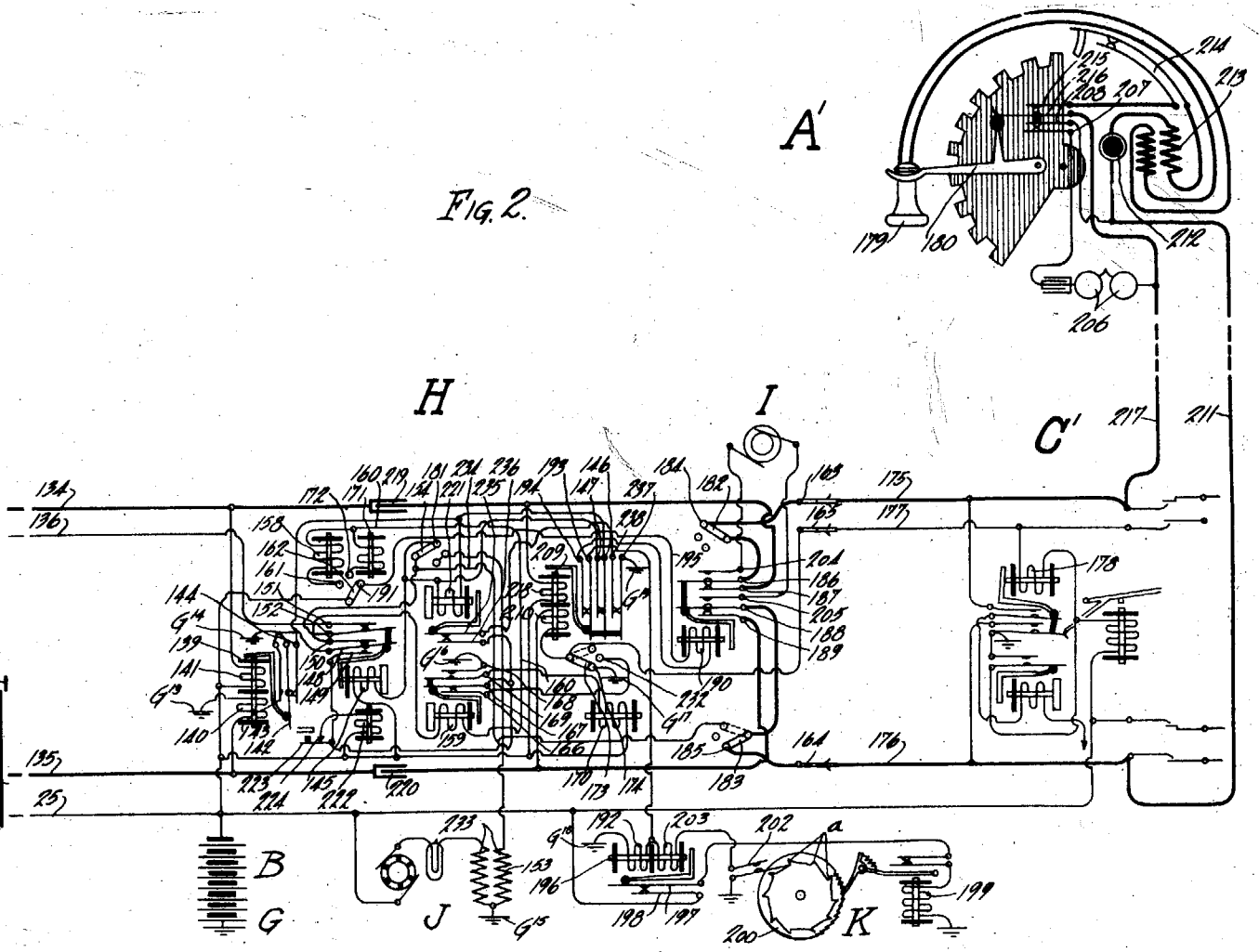

In Fig. 2 there is shown diagrammatically a connector switch H, at I a central office ringer generator is shown and at J a busy-signaling device. K represents a device for interrupting the energizing circuit of the ringer relay—that is, by means of the apparatus K the ringer relay may be caused to energize intermittently. To the line of the substation A′ there is allotted the line switch C′ which is like the line switch C.

Figs. 1 and 2 taken together represent diagrammatically the central office switching apparatus involved in establishing a connection between two substations. In Fig. 2 a central battery is shown at B having its positive terminal preferably grounded at G. The central office switching apparatus is of the general type disclosed in English Patent No. 26,301 of 1906, but with modifications and circuit changes to adapt the same to operate in connection with a two-wire system—that is, a system in which there is no ground connection at the subscriber's telephone. The line switches of which C and C′ are modified forms are also disclosed in The Western Electrician of January 25, 1908, and the American Telephone Journal of June 6, 1908. The master switch D is also of the form disclosed in the said Western Electrician and the American Telephone Journal. The first-selector E and second-selector F are of the general type shown in United States Letters Patent No. 815,321, granted March 13, 1906, to Keith, Erickson and Erickson, while the connector switch H is of the general type shown in United States Letters Patent No. 815,176, granted March 13, 1906, to Keith, Erickson and Erickson.

Figure 3:
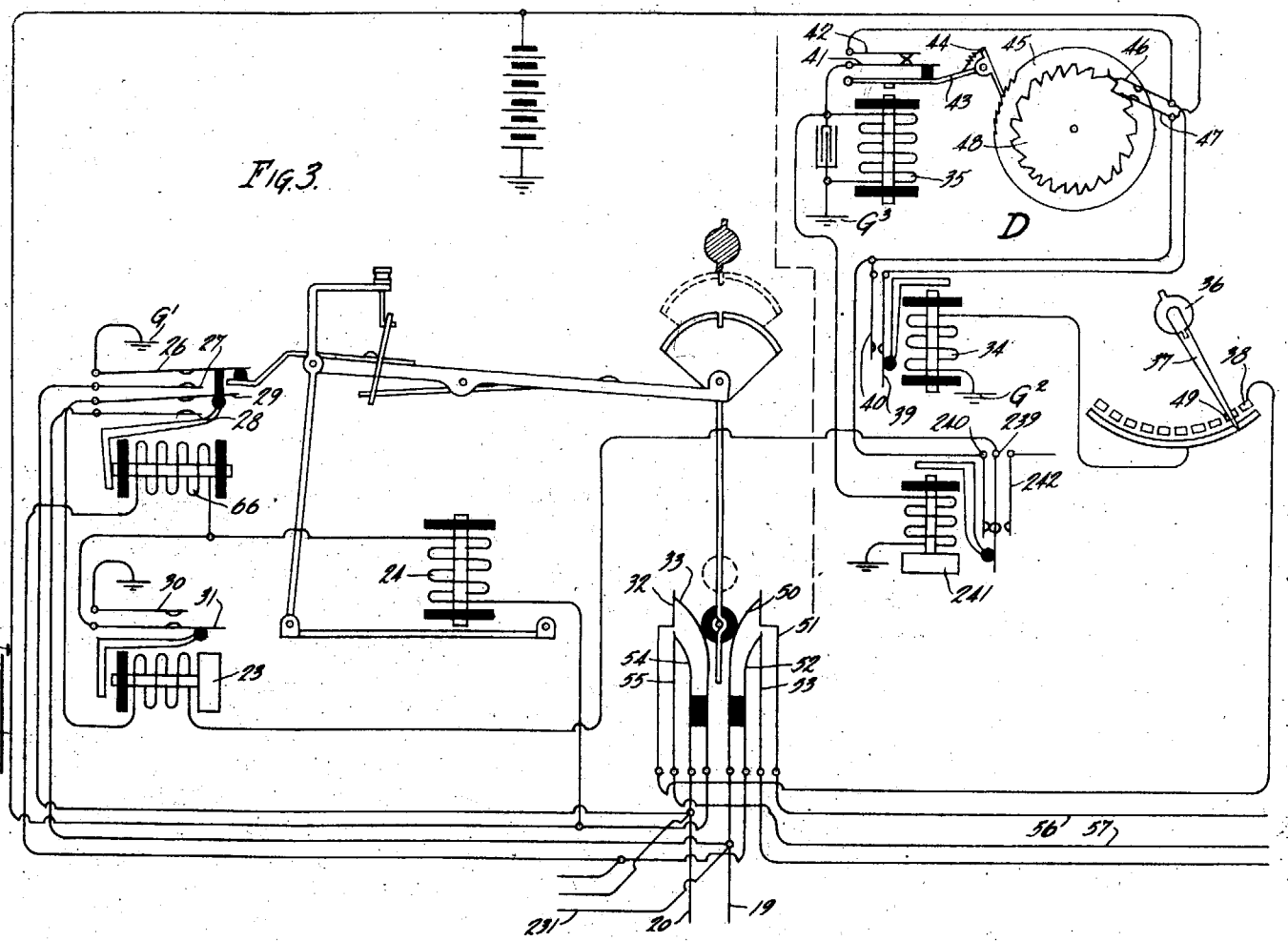

Fig. 3 is a diagrammatic view showing the line switch, the line switch plunger and the line switch bank, together with the circuits and parts of the master switch.

The subscriber's substation, it will be seen, is somewhat different from the usual automatic substation, substation A being arranged and modified to operate in connection with a two-wire system—that is, a system in which no ground connection is used at the subscriber's substation. Substation A, for example, comprises the usual receiver 2, switch-hook 3, induction coil 4 which consists of the primary winding 5 and secondary winding 6, transmitter 7, condenser 8, ringer 9 and impulse wheel 10, which latter has the usual impulse teeth 11. The impulse wheel 10 is secured to the shaft 12, to which shaft there is also secured the dial (not shown). When the dial is turned the impulse teeth 11 are adapted to engage the cam 13 upon the end of the spring 14 and thereby carry the latter out of engagement with the spring 15. Upon the switch-hook 3 there is the cam 16 which, when the switch-hook is up, permits the springs 17 and 18 to engage, thereby bridging across the subscriber's line conductors 19 and 20 the primary circuit including the transmitter 7 in series with the primary winding 5; but when the switch-hook is lowered the spring 21 is carried into engagement with the spring 22, whereby the ringer 9 in series with the condenser 8 is bridged across the line conductors 19 and 20 instead.

The connector switch H (Fig. 2), like the line switch C and first-selector E, is arranged to operate is a system in which there is no ground connection at the subscriber's station.

A clearer understanding of my improved system may be had from an explanation of its operation when a subscriber operates the central office switches to establish a connection. For example, it will be pointed out how the subscriber at substation A may operate the main office switches to establish connection with substation A′ (Fig. 2), the number of which is 2220. To call the number 2220 the subscriber at substation A, after removing the receiver from the switch-hook, operates the calling device for each digit in the well-known manner. When the receiver is removed from the switch-hook, and the springs 17 and 18 engage, an energizing circuit is closed through the line relay 23 of the line switch C. When this relay energizes, a circuit is closed through the trip or plunger magnet 24, which then operates to force the plunger into a bank terminal and extend the calling line conductors to a trunk-line leading to a selector switch. The dial is operated for the first digit, and upon returning to normal position operates the first-selector switch to establish connection with a trunk-line leading to a second-selector switch. The second-selector is then operated for the second digit to select a trunk-line leading to a connector switch. The impulses delivered by the dial for the last two digits are directed toward the connector, which operates to place its shaft wipers in connection with the contacts corresponding to the desired number. When the substation primary circuit is bridged across the line conductors 19 and 20 an energizing circuit is established through the line relay 23, said circuit extending from ground G′ through the springs 26 and 27 to the line conductor 20, through the transmitter 7 and primary winding 5, impulse springs 14 and 15, springs 17 and 18 to the line conductor 19, springs 28 and 29, winding of the line relay 23 to the battery lead 25, thence through battery B to ground G. The line relay, upon energizing, presses the springs 30 and 31 into contact. As shown, the line relay 23 is slow-acting—that is, when once energized and the energizing circuit is then broken, the relay does not instantly return to normal position, but remains in its energized position for a short interval. The engagement of the springs 30 and 31 closes an energizing circuit through the trip or plunger magnet 24, which magnet operates to attract the plunger arm and thrust the plunger into an idle bank terminal. The plunger magnet circuit extends from ground G′ through the springs 30 and 31, plunger magnet 24 to the battery lead 25, thence through battery B to ground G. When the plunger enters the bank terminal and closes the bank springs 32 and 33 into contact an energizing circuit is closed through the motor magnet relay 34, which in turn operates to close a circuit through the motor magnet 35 of the master switch D. The motor magnet then operates to advance all idle plungers that are in locked engagement with the plunger shaft 36 to a position opposite the next idle bank terminal similar to the one just engaged. The circuit through the motor magnet relay extends from ground $G^2$ through the relay 34 to the common segment of the master switch bank, wiper 37, individual segment 38, through the bank springs 32 and 33 to the battery lead 25, etc. The relay 34, upon energizing, operates to place the springs 39 and 40 in contact, whereby a circuit is closed through the motor magnet 35, said circuit extending from ground $G^3$ through the motor magnet 35, interrupter springs 41 and 42, motor magnet relay springs 39 and 40 to the battery lead 25, etc. The motor magnet, upon energizing, attracts its armature 43, and the pawl 44 engages a tooth of the ratchet wheel 45 and moves the latter one step. When this occurs the spring 46 engages the spring 47 (bearing in mind that the spring 46, prior to this operation, engaged a notch of the toothed wheel 48), and when the ratchet wheel 45 is given one step the spring 46 slides off from the top of the notch and engages the spring 47. The engagement of these two springs provides a new energizing circuit for the motor magnet 35, said circuit extending through the springs 46 and 47 to the battery lead 25 instead of through the springs 39 and 40. Furthermore, the motor magnet, when energized, separates the interrupter springs 41 and 42, thereby breaking its own circuit like a buzzer. The motor magnet 35 continues to operate in this manner as long as the springs 46 and 47 remain in engagement. When the next succeeding tooth on the wheel 48 advances far enough the spring 47 disengages from the spring 46, thereby opening the energizing circuit for the motor magnet.

By the time the last notch disengages the springs 46 and 47 the master switch wiper 37 has passed from the first contact 38 to the second contact 49. Suppose, however, that when the wiper 37 engages the individual segment 49 there then is a guarding potential present. In that event an energizing circuit is closed through the motor magnet relay 34, said circuit extending from the contact through the wiper 37, common segment of the master switch bank, through the winding of the relay 34 to ground $G^2$, as previously traced. The motor magnet relay again energizes and closes the circuit for the motor magnet. The motor magnet operates as before, and the wiper 37 is carried to the next contact, and the next tooth of the wheel 48 separates the springs 46 and 47. This operation continues as long as the wiper 37 continues to find contacts with protecting potential. It will be understood, of course, that when the motor magnet 35 thus operates, the plunger shaft 36 and all plungers that are in locking engagement with the said shaft are moved to a new position opposite an idle bank terminal similar to the one engaged by the line switch C, and at the same time the bridge-cut-off springs 26 and 29 are separated from the springs 27 and 28, respectively, to disconnect the line conductors from the line switch C. At the instant that the plunger enters the bank the following springs are pressed into contact: 50 and 51, 52 and 53, 54 and 55, and 32 and 33. The engagement of the springs 50 and 51 and 54 and 55 extends the calling subscriber's line conductors 19 and 20 to the trunk-line conductors 56 and 57 which terminate in the first-selector E. This extension of the line provides an energizing circuit for the line relay 58 of the first-selector. The circuit extends from ground $G^4$ through the winding 59, side switch wiper 60, trunk conductor 57, bank springs 55 and 54, line conductor 20, transmitter 7, primary winding 5, impulse springs 14 and 15, springs 17 and 18, line conductor 19, bank springs 50 and 51, trunk conductor 56, side switch wiper 61, through winding 62 to the battery lead 25, thence through battery B to ground G. The line relay 58 thereupon energizes and operates to carry the spring 63 out of engagement with the spring 64 and into engagement with the spring 65, thereby providing an energizing circuit for the slow-acting release relay 67, which latter in turn operates to provide an energizing circuit for the bridge-cut-off relay 66 of the line switch C. This circuit extends from ground $G^5$ through the springs 68 and 69, winding of the supervisory relay 70, conductor 71, bank springs 53 and 52, bridge-cut-off relay 66, trip or plunger magnet 24 to the battery lead 25, thence through battery B to ground G. Since the cut-off springs 26 and 27 are already in an operated position the energization of the relay 66 at this time is without particular function. The trip or plunger magnet 24, being also included in this circuit, retains the plunger arm in an attracted position and the plunger in the bank terminal. Thus it will be seen that the line switch, after being operated from the subscriber's station, is maintained in its operated position by a ground connection at the first-selector switch E. Furthermore, the supervisory relay 70 also energizes and places the springs 72 and 73 in contact, thereby closing a circuit through the supervisory lamp 74 which extends from ground $G^6$ through the side switch wiper 75, springs 72 and 73, lamp 74 to the battery lead 25, thence through battery B to ground G. The slow-acting release relay 67 also carries the spring 76 from the spring 77 and into contact with the spring 78.

The foregoing is the condition of the central office switches after the calling subscriber removes his receiver and before the dial is turned. When the dial returns to normal position for the first digit 2 the first-selector switch E is operated. The first digit being 2, the impulse spring 14 is twice carried out of engagement with the impulse spring 15. As a result the energizing circuit through the line relay 58 is broken twice, and the spring 63 comes into contact with the spring 64 twice. After the two impulses are thus delivered the line relay 58 again energizes and carries the spring 63 into contact with the spring 65. As previously explained, the relay 67 is a slow-acting relay—that is, slow to deenergize; and when this energizing circuit is momentarily broken during the vertical impulses just delivered, the said relay does not deenergize but remains in an operated position with the springs 68 and 76 in contact with the springs 69 and 78. Then when the spring 63 engages the spring 65 two impulses are transmitted to the vertical magnet 79, extending from ground $G^7$ through the springs 63 and 64 to the springs 76 and 78, through the private magnet relay 80, through the winding of the vertical magnet 79, contact point 81, side switch wiper 82 to the battery lead 25, thence through battery B to ground G. The two impulses being delivered, the vertical magnet 79 is thereby energized twice, and the shaft wipers are given two vertical steps in the well-known manner. It will be seen that the private magnet relay 80 is included in the energizing circuit of the vertical magnet 79. This relay also energizes, but being a slow-acting relay it energizes on the first impulse and remains so until all the impulses are transmitted. This relay, upon energizing, operates to close the springs 83 and 84 in contact, whereby an energizing circuit is established through the private magnet 85. This circuit extends from ground $G^7$ through the springs 83 and 84, private magnet 85 to the battery lead 25 thence through battery B to ground G. The private magnet relay 85 deenergizes after the last vertical impulse, since this energizing circuit is no longer maintained after the springs 63 and 64 disengage. Hence, the said relay again deenergizes, permitting the springs 83 and 84 to disengage, whereby the energizing circuit through the private magnet 85 is in turn broken, which private magnet now deenergizes and permits the side switch to pass from first to second position, permitting the side switch wipers 86 and 82 to engage the contact points 87 and 88, respectively. The closure of contact between the side switch wiper 82 and the contact point 88 sets up an energizing circuit for the rotary magnet 89. As shown at L in Fig. 1, a pair of relays is provided for producing the intermittent energization of the rotary magnet 89. The energizing circuit extends from ground $G^8$ through the springs 90 and 91, relay 92, winding of the rotary magnet 89, contact point 88, side switch wiper 82 to the battery lead 25, thence through battery B to ground G, the rotary magnet and relay 92 energizing in series. The rotary magnet moves the shaft wipers one step, and the relay 92, upon energizing, places the springs 93 and 94 in contact, whereby a circuit is closed from ground $G^8$ through the said springs and relay 95. The relay 95 then operates to separate the springs 90 and 91, thereby breaking the circuit for the relay 92 and the rotary magnet 89, which restore to normal. When the relay springs 93 and 94 disengage, the circuit for the relay 95 is broken and it returns to normal, permitting the springs 90 and 91 to engage, thereby closing the circuit through the relay 92 and the rotary magnet 89 as before, as long as the side switch wiper 82 remains in second position. From the foregoing it will be seen that one relay, upon energizing, provides a circuit for a second relay, which latter, upon energizing, breaks the circuit for the first relay, which then restores to normal, breaking the energizing circuit for the second relay. It should be stated that the relays L may be allotted to a group of first-selector switches and used in common to produce the intermittent energizing of the rotary magnets. At M there is shown a like pair of relays for producing the intermittent energization of a group of second-selector switches. The said rotary magnet then operates to rotate the shaft wipers 97, 98 and 99 of the selector E into engagement with the first contact of the second level of the selector banks, from which contact it is assumed that the trunk-line conductors 100, 101 and 102 lead to the second-selector switch F. If the first trunk-line is busy, however, and the wipers have to pass over busy trunk-lines, then as soon as the private wiper 99 engages the first private bank contact the private magnet 85 again energizes, locking the side switch in second position. The energizing circuit for said private magnet extends from the grounded terminal G of the battery B through an occupying switch (not shown), through the private wiper 99, thence through the conductor 103 to the side switch wiper 86, contact point 87, through the winding of the private magnet 85 to the battery lead 25, thence through battery B to ground G. The private magnet 85, upon thus becoming energized, locks the side switch wiper 82 in engagement with the contact point 88, whereby the rotary magnet 89 will be energized step by step until the wipers are carried beyond the last busy trunk-line. At the instant that the private wiper leaves the last busy contact point the energizing circuit through the private magnet 85 is destroyed, and as a result the selector side switch passes to third position. If, however, there are no busy trunk-lines the private magnet 85 releases the side switch to third position as soon as the wipers are carried into engagement with the first trunk-line. As soon as the side switch passes to third position, as stated, the subscriber's line conductors 19 and 20 are extended to the conductors 100 and 101 which, in this case, it is assumed lead to the second-selector switch F. The extending of the line occurs, of course, as soon as the side switch wipers 61 and 60 engage the contact points 104 and 105, respectively. When the subscriber's line is thus extended to the selector switch F an energizing circuit is established through the line relay 106 in the same manner in which the energizing circuit was established through the line relay 58 of the selector E when the subscriber's line conductors 19 and 20 were extended through the line switch bank to the trunk conductors 56 and 57. The relay 106, upon energizing, operates to shift the spring 107 from the spring 108 to the spring 109. When the springs 107 and 109 engage, an energizing circuit is established through the slow-acting release relay 110. This circuit extends from ground $G^9$ through the springs 107 and 109, through the relay 110 to the battery lead 25, thence through battery B to ground G. The relay, upon energizing, operates to shift the spring 111 from the spring 112 to the spring 113, and the springs 114 and 115 are also closed in contact. This operation of the second-selector switch F occurs at the instant that the side switch wipers 61 and 60 of the selector switch E pass to third position and extend the subscriber's line conductors 19 and 20 to the second-selector switch F. When the second-selector switch, therefore, operates, a guarding potential is established at the private wiper 99 for protecting the seized trunk-line conductors 100 and 101 against seizure by another calling first-selector. This guarding potential extends from ground $G^{10}$ to the contact point 116, side switch wiper 117, through the springs 115 and 114, conductor 102 to the contact engaged by the private wiper 99. Furthermore, when the first-selector switch E operates and the side switch passes to third position, a new energizing circuit is established through the release relay 67. This energizing circuit extends from ground $G^{10}$ at the selector switch F through the springs 115 and 114, conductor 102, shaft wiper 99, conductor 103, through the side switch wiper 86, contact point 118, relay 67, thence through battery B to ground G. The relay 67 thus remains in an operated position with the spring 68 in engagement with the spring 69, but the line relay 58 returns to normal position when the side switch wipers 60 and 61 engage the contact points 105 and 104, respectively. The energizing circuit through the line relay 106 extends from ground $G^{11}$ through the winding 119 to the side switch wiper 120, thence through the conductor 101, conductor 57 and line conductor 20, through the primary circuit of the substation, through the line conductor 19, thence through the trunk conductor 56, conductor 100, side switch wiper 121, through the winding 122′ of the relay 106 to the battery lead 25, thence through battery B to ground G. When the dial returns to normal position for the second digit 2, this circuit through the line relay 106 is interrupted twice when the impulse spring 14 is carried out of engagement with the spring 15 by the impulse teeth on the wheel 10. The circuit being interrupted twice, the said relay 106 momentarily deenergizes, thus permitting the spring 107 to engage the spring 108, whereby an energizing circuit is completed through the vertical magnet 122, said circuit extending from ground $G^{12}$ to the springs 107 and 108, springs 111 and 113, through the winding of the private magnet relay 123, through the winding of the vertical magnet 122, contact point 124, side switch wiper 125 to the battery lead 25, thence through battery B to ground G. The private magnet relay 123, being included in this circuit, energizes and, since it is a slow-acting relay, remains in an operated position until the last vertical impulse is delivered, and the relay 106 remains energized with the spring 107 in contact with the spring 109, whereby the circuit through the private magnet relay and the vertical magnet 122 remains open. When the relay 123 energizes, the springs 126 and 127 are pressed into contact, thereby causing an energizing current to flow through the private magnet 128, the circuit extending from ground $G^{12}$ through the springs 107 and 108, through the winding of the private magnet 128 to the battery lead 25, thence through battery B to ground G. When the relay 123 deenergizes and breaks the energizing circuit through the private magnet 128, the private magnet also deenergizes and permits the side switch to pass from first to second position. When the side switch wiper 125 passes to second position and into engagement with the contact point 129 an energizing circuit is established through the rotary magnet 130 which now operates, as explained in connection with the rotary magnet 89 of the selector switch E, to select an idle trunk-line leading to the connector switch. After the switch comes to rest with the side switch in third position, the shaft wipers 131, 132 and 133 are in engagement with the trunk conductors 134, 135 and 136, respectively, which lead to the connector switch H (Fig. 2). At the instant that the side switch wipers 121 and 120 pass to third position into engagement with the contact points 137 and 138, the subscriber's line conductors are extended to the connector switch H, and an energizing circuit is established through the line relay 139 in the same manner in which the energizing circuit was established through the line relay 106 of the selector switch F when the side switch wipers of the first-selector passed to third position. The energizing circuit through the line relay 139 extends from ground $G^{13}$ through the winding 140, trunk conductors 135, 101 and 57 to the line conductor 20, thence through the substation to the line conductor 19, trunk conductors 56, 100 and 134, thence through the winding 141 to the battery lead 25, and through battery B to ground G. The line relay 139, upon energizing, operates to shift the spring 142 from the spring 143 to the spring 144, whereby an energizing circuit is established through the release relay 145 extending from ground $G^{14}$ through the springs 142 and 144, springs 146 and 147, relay 145 to the battery lead 25, thence through battery B to ground G. When the relay 145 energizes, the spring 148 is shifted out of contact with the spring 149 and into contact with the spring 150, and the spring 152 is shifted into engagement with the spring 151. This primary operation of the connector relays 139 and 145 occurs at the instant that the side switch wipers 120 and 121 of the selector F pass to third position and extend the subscriber's line conductors to the connector H. The engagement of the springs 151 and 152 establishes a guarding potential for protecting the trunk-line conductors 134, 135 and 136 against seizure by another line and second-selector. This potential extends from ground $G^{15}$ through the winding 153 of the busy-signaling device to the side switch wiper 154 (in second position), springs 152 and 151, conductor 136 to the private bank contact engaged by the shaft wiper 133. Furthermore, when the side switch of the second-selector F passes to third position a new energizing circuit is established through the release relay 110, said circuit extending from ground $G^{15}$ at the connector switch H (Fig. 2) through the springs 152 and 151, conductor 136, side switch wiper 155, conductor 156, from which one branch passes through the relay 110 to battery, while another branch extends through the contact point 157, side switch wiper 117, springs 115 and 114, conductor 102 to the bank contact engaged by the private wiper 99 of the selector switch E, thence to and through the relay 67, as previously traced. The operation of the dial for the last two digits affects the connector switch, and when the dial is operated for the third digit 2 the impulse spring 14 is twice carried out of engagement with the spring 15, thereby momentarily deenergizing the line relay 139 twice, whereby the spring 142 twice engages the spring 143, thus sending two impulses to the vertical magnet 158 from ground $G^{14}$ through the springs 142 and 143, springs 148 and 150, private magnet relay 159, through the vertical magnet 158, contact point 161, side switch wiper 162 to the battery lead 25, thence through battery B to ground G. The private magnet relay 159 energizes when the first impulse is delivered, and since the said relay is slow-acting it remains in an operated position until all the vertical impulses are sent. The vertical magnet, upon being energized, operates one step at a time to carry the shaft wipers 163, 164 and 165 two steps to a point opposite the second level. The relay 159, upon energizing, shifts the springs 166 and 167 out of engagement, and the spring 169 is shifted into engagement with the spring 168. When the springs 168 and 169 engage, an energizing circuit is established through the private magnet 170 from ground $G^{16}$ through the springs 168 and 169, private magnet 170 to the battery lead 25, thence through battery B to ground G. The relay 159, being a slow-acting relay, remains in an operated position while the vertical impulses are being sent; but after all the impulses are delivered, and the line relay 139 returns to its operated position, the circuit through the relay 159 becomes broken, thus permitting the springs 167 and 169 to return to normal position. When the springs 169 and 168 disengage, the circuit through the private magnet 170 becomes broken, whereby the said magnet deenergizes, permitting the side switch to pass from first to second position. The calling subscriber now operates the calling device for the last digit 0, thereby transmitting ten impulses and operating the line relay 139 ten times. Each time that the line relay springs 142 and 143 engage, an energizing circuit is established through the rotary magnet 161 from ground $G^{14}$ through the said springs 142 and 143 and the springs 148 and 150, through the private magnet relay 159, through the rotary magnet 171 to the contact point 172, thence through the side switch wiper 162 to the battery lead 25, and through battery B to ground G. Again the private magnet relay energizes, as in the previous case, remaining so until all the impulses are transmitted, thereby retaining the private magnet energized also. The rotary magnet 171 then operates to rotate the shaft wipers into engagement with the desired line #2220. If this line is busy at the time, the connector will be given the busy-release in the manner to be described, and the calling subscriber is given the busy-signal, thus making it impossible to extend the calling line into connection with the called line.

Before describing the results that follow when the connector finds a busy line, the description of how a connection is established will be completed. As soon as the line relay 139 ceases to operate for the last digit the private magnet relay 159 deenergizes, as heretofore explained, permitting, in this instance, the side switch to trip to third position. The result is that the side switch wipers respectively engage their contact points of the third position. When the side switch wiper 173 engages the contact point 174 a guarding potential is completed at the private wiper 165 for protecting the seized line from outside interference while the connection is established. This guarding potential extends from ground $G^{17}$ to the contact point 174, thence by way of the side switch wiper 173 to the private wiper 165. Not only does this guarding potential prevent other connectors from calling-in on the same line over multiples of the normal conductors 175, 176 and 177, but it also provides means for energizing the cut-off relay 178 of the line switch C′, whereby the said switch C′ is prevented from operating when the called subscriber removes his receiver 179 from the switch-hook 180. It will also be seen that when the side switch passed to third position the trunk-release conductor 136 that runs between the second-seclector and the connector is provided with guarding potential from ground $G^{14}$ through the line relay springs 142 and 144, back-bridge relay springs 146 and 147, contact point 181, side switch wiper 154, release relay springs 152 and 151 to the trunk conductor 136. However, while the side switch is in first and second position a guarding potential for this trunk 136 is provided from ground $G^{15}$ directly through the low resistance winding 153 and the side switch wiper 154. The reason for this is that the guarding potential from ground $G^{14}$ is interrupted while the line relay 139 is operating, and there is a possibility of some other selector similar to the selector F stopping on the same trunk-line. After the side switch passes to third position, however, there is no such danger, and the potential is provided from ground $G^{14}$ through the line relay springs, as stated. Of course, when the side switch wipers 182 and 183 engage their third-position contact points 184 and 185 the calling subscriber's line is placed in connection with the called subscriber's line over the heavy conductors shown, passing through the ringer relay springs 186 and 187 on one side, and 188 and 189 on the other side. As soon as connection is thus established the ringer relay 190 is energized over the circuit established when the side switch wiper 162 engages the contact point 191, the energizing current flowing from ground $G^{18}$ at the ringer interrupter, through the winding 192 of the relay 196, through the back-bridge relay springs 193 and 194, ringer relay 190, conductor 195, contact point 191, side switch wiper 162 to the battery lead 25, thence through battery B to ground G. The relay 196 thereupon energizes, while the ringer relay 190, which is of lower resistance, remains in normal position. The relay 196, upon energizing, closes the springs 197 and 198 in contact, thereby closing a circuit through the motor magnet 199 which operates the ratchet wheel 200. As the wheel 200 rotates, the teeth *a* momentarily press the springs 201 and 202 into contact, thereby closing a circuit through the second winding 203 of the relay 196. This winding is of lower resistance and the ringer relay 190 now energizes, while a tooth *a* maintains the springs 201 and 202 in contact. It will be seen that as the ratchet wheel 200 revolves, the energizing circuit of the ringer relay 190 will be broken periodically so as not to ring the called subscriber continuously. Furthermore, it will be seen that each time that the ringer relay is energized the springs 186 and 188 are separated from the ringer relay springs 187 and 189, thereby breaking the calling line from the called line, and pressed into engagement with the springs 204 and 205 which are the terminals of the ringer generator I. As a result ringing current is sent over the called line for energizing the bell 206 while the springs 207 and 208 are in contact. However, as soon as the called subscriber answers, the back-bridge relay 209 is energized by a flow of current from ground $G^{17}$, contact point 174, side switch wiper 173, winding 210 of the back-bridge relay 209, ringer relay springs 189 and 188, side switch wiper 183, contact point 185, line wiper 164, normal conductor 176, conductor 211, transmitter 212, primary winding 213, impulse springs 214, switch-hook springs 215 and 216, line conductor 217, normal conductor 175, line wiper 163, contact point 184, side switch, wiper 182, ringer relay springs 186 and 187, winding 218 of the back-bridge relay 209, thence to the battery lead 25 and through battery B to ground G. When once the back-bridge relay 209 is energized the energizing circuit for the ringer relay 190 is interrupted at a point between the springs 193 and 194, thus making it impossible for the ringer relay to energize as long as the called subscriber is on the line. Furthermore, when the relay 209 energizes, the springs 146 and 147 also disengage, thereby interrupting the circuit which provided a guarding potential to the conductor 136. When the springs 146 and 147 thus disengage, the relay 221, being included in series instead of in multiple as before, energizes, but at this time produces no effect. The subscribers being thus connected may communicate over the main talking conductors indicated by the heavy lines in Figs. 1 and 2 and including on one side the condenser 219 at the connector H and on the other side the condenser 220. After the subscribers are through talking, if the calling subscriber hangs up his receiver he opens the line circuit at a point between the springs 17 and 18, thereby initiating the release of all the switches. This release is brought about as follows: At the instant that the circuit is broken between the said springs 17 and 18 the double-wound line relay 139 and the release relay 145 of the connector H deenergize. At the instant that the slow-acting relay 145 and the line relay 189 deenergize, the energizing circuit for the release magnet 222 is closed at a point between the springs 148 and 149 and at another point between the springs 142 and 143. A flow of current is, therefore, set up from ground $G^{14}$ through the springs 142 and 143, through the springs 148 and 149 to the off-normal spring 223, to the contact point 224, to the release magnet 222, thence through said magnet to the battery lead 25, and through battery B to ground G. The release magnet instantly releases the connector switch shaft and side switch, thereby breaking the energizing circuit through the back-bridge relay 209 (if the called subscriber has not in the meantime restored his receiver), and also the energizing circuit through the bridge-cut-off relay 178 of the called line switch C′. As soon as the connector switch shaft reaches its lowest position it breaks the circuit for the release magnet 222 by separating the off-normal spring 223 from the contact point 224, at which instant the release magnet of the connector is also restored. The operation of the line relay 139 and of the slow-acting relay 145 not only causes the release of the connector, as described, but also the release of the preceding switches, because the ground connection from ground $G^{14}$ to the trunk-release conductor 136 is interrupted by both of these relays. Since the release relays 67 and 110 are dependent upon this ground for their energized condition, as already explained, it follows that they will fall back with the following results: As soon as the release relay 110 of the second-selector F deenergizes, the spring 111 falls back into normal engagement with the spring 112, thereby closing an energizing circuit for the release magnet 225 from ground $G^{12}$ through the springs 107 and 108, through the springs 111 and 112 to the release magnet 225, thence to the contact point 226, off-normal spring 227 to the battery lead 25, thence through battery B to ground G. As soon as the release magnet 225 energizes, the second-selector side switch and switch shaft are restored, which shaft, upon reaching its lowest position, opens a release circuit at a point between the off-normal spring 227 and the contact point 226, whereby the release magnet 225 is restored also. When the release relay 67 of the selector E deenergizes, the springs 76 and 77 are brought into contact, and as a result the energizing circuit for the release magnet 228 is closed. The energizing current for this release magnet 228 then flows from ground $G^7$ through the springs 63 and 64 and through the said springs 76 and 77 to the release magnet 228, thence through said magnet to the contact point 229, off-normal spring 230 to the battery lead 25, thence through battery B to ground G. The release magnet, upon energizing, then restores the first-selector side switch and switch shaft, which shaft, upon reaching its lowest position, opens the energizing circuit for the release magnet 228 at a point between the off-normal spring 230 and the contact point 229. Furthermore, when the release relay 67 deenergizes and separates the springs 68 and 69, the energizing circuit of the bridge-cut-off relay in series with the plunger magnet 24 becomes broken, and as a result the bridge-cut-off relay and plunger magnet 24 restore to normal position. Consequently the bank springs 52 and 53, as well as the other bank springs of the line switch C, are separated, thus preventing any further action from the trunk. After the switches are thus restored the calling subscriber can, of course, then proceed to make another call.

Returning now to that stage of the call where the calling subscriber was operating the connector switch in accordance with the last digit 0, it will now be explained what takes place in the event that the desired line is busy. When the line #2220 is calling, or when it has been called by someone else, the private bank contacts in which the normal conductor 177 terminates are connected to ground. If another connector switch has called the line this guarding potential would be supplied through the connector switch from a ground terminal similar to the ground terminal $G^{17}$ in the connector switch H, as already explained; but if the line switch C′ is calling, a guarding potential is established from the trunk-line relay ground as in Fig. 1 and thence to the private bank contact. In a similar manner the line switch C protects the calling line A when the bank springs 52 and 53 come into contact from ground $G^5$, from which ground connection is established through the said bank springs to the private normal conductor 231. Therefore, when the subscriber sends in the last impulse the private wiper 165 is carried onto the grounded contact, and when the slow-acting relay 159 of the connector deenergizes, instead of the side switch tripping to third position, as in the case where the line is not busy, the connector is given the busy-release as follows: When the private magnet relay 159 deenergizes and the springs 166 and 167 engage, an energizing circuit is completed through the release magnet 222, said circuit extending from the busy or grounded private bank contact, private wiper 165, side switch wiper 173, contact point 232 (bearing in mind that the side switch is in second position), springs 166 and 167, normal spring 223, contact point 224, through the release magnet 222 to the battery lead 25, thence through battery B to ground G. The release magnet thereupon energizes and operates to restore the side switch and shaft wipers to normal position. When the side switch restores to first position, the calling subscriber is given the busy-signal. The path of the busy-signaling current extends from ground $G^{15}$ through the winding 153 of the induction coil 233, through the side switch wiper 154 which is now in first position, conductor 234, side switch wiper 183, ringer relay springs 188 and 189, through the condenser 220 to the trunk conductor 135, thence through the subscriber's station to the line conductor 19 and trunk conductor 134, through the winding 141 of the line relay to the battery lead 25, thence through battery B to ground G. When the calling subscriber receives the busy-signal he understands that the line is busy and hangs up his receiver. The line circuit is opened, as already explained, with the result that the line and slow-acting relays 139 and 145 of the connector H deenergize, causing the release of the connector and all other switches, as heretofore explained.

It should also be stated that the connector H is provided with a back-release relay—that is, a release relay which so controls a circuit of the release magnet that when the called subscriber restores his receiver to the switch-hook (before the calling subscriber releases the connector) the energizing circuit for the release magnet 222 is closed. This back-release is initiated as follows: When the called subscriber answers, the relay 209 energizes and separates the springs 146 and 147, which removes a shunt from the relay 221, thus permitting the latter to energize and place the springs 235 and 236 in contact. Now, when the called subscriber restores his receiver the relay 209 deenergizes and permits the springs 237 and 238 to engage, thereby closing an energizing circuit for the release magnet 222. This circuit extends from ground $G^{19}$ through the springs 237 and 238, springs 235 and 236, normal spring 223, contact point 224, through the release magnet 222 to the battery lead 25, thence through battery B to ground G. The connector release magnet then energizes and restores the connector side switch and shaft wipers to normal position. The release of the remaining switches used in establishing the connection is brought about when the calling subscriber restores his receiver to the switch-hook.

In the foregoing it has been pointed out how the subscriber at A may establish connection with the substation A′. Any other subscriber of the entire system may operate the central office switching mechanism in a similar manner to extend connection to any desired line. It will be seen that the relay 23 of the line switch C is normally connected with the battery lead 25 through the springs 239 and 240 of the so-called open main relay 241 which energizes in multiple with the motor magnet 35. The object in thus putting the energizing circuit in the relay 23 under the control of the relay 241 is to prevent any subscriber from operating his line switch while the master switch is operating, to eliminate any possibility of a line switch tripping onto a trunk that is already in use. It will be seen that when the relay 241 energizes, the spring 239 is separated from the spring 240 and carried into engagement with the spring 242, through which latter a busy-signal may be transmitted to the subscriber's station in case he should attempt to make a call while the master switch is rotating. It is obvious that if all of the trunks are made busy the master switch will not stop until some one of the trunks becomes idle, so that the subscriber not only gets a busy-signal if he attempts to operate his line switch while it is passing from one point to another, but also if he tries to call while all of the trunks are busy.

It will be seen that the line switch C diagrammatically shown in Fig. 1 is more fully represented in Fig. 3. In the said Fig. 3 the plunger arm is more fully shown, controlling by its left terminal the spring 26 and carrying on the right end the plunger which operates the bank springs, such as the bank springs 50, 51, 52, 53, 54, 55, 32 and 33.

From the foregoing it will be seen that I provide an improved and highly efficient two-wire system for automatically trunking calling lines into connection with called lines.

What I claim as my invention is:—

1. In a telephone system, a line, a plurality of trunks, a plunger for traversing the trunks and connecting the line with an idle one thereof, a magnet for drawing the plunger into position to close the connection, a line relay bridged on the line and controlling said magnet, a bridge-cut-off relay, and a circuit for energizing said magnet and cut-off relay in series.

2. In a telephone system, a line, a plurality of trunks, a plunger for traversing the trunks and connecting the line with an idle one thereof, a magnet for drawing the plunger into position to close the connection, a line relay bridged on the line and controlling said magnet, a bridge-cut-off relay, and a circuit for energizing said magnet and cut-off relay in series, said magnet provided with an armature having a finger adapted to open the springs of said cut-off relay.

3. In a telephone system, a line, a plurality of trunks, a plunger for traversing the trunks and connecting the line with an idle one thereof, a magnet for drawing the plunger into position to close the connection, a line relay bridged on the line and controlling said magnet, a bridge-cut-off relay, and a circuit for energizing said magnet and cut-off relay in series, said circuit including a trunk conductor.

4. In a telephone system, a line, a plurality of trunks, a plunger for traversing the trunks and connecting the line with an idle one thereof, a magnet for drawing the plunger into position to close the connection, a line relay bridged on the line and controlling said magnet, a bridge-cut-off relay, and a circuit for energizing said magnet and cut-off relay in series, said circuit including a third or non-talking conductor of any one of said trunks.

5. In a telephone system, a line, a plurality of trunks, a plunger for traversing the trunks and connecting the line with an idle one thereof, a magnet for drawing the plunger into position to close the connection, a line relay bridged on the line and controlling said magnet, a bridge-cut-off relay, a circuit for energizing said magnet and cut-off relay in series, and a third relay, said circuit including normally open contacts of said third relay, said relay provided with an energizing circuit closed during conversation.

6. In a telephone system, a line, a plurality of trunks, a plunger for traversing the trunks and connecting the line with an idle one thereof, a magnet for drawing the plunger into position to close the connection, a line relay bridged on the line and controlling said magnet, and a bridge-cut-off relay, said magnet provided with an armature having a finger adapted to open the springs of said cut-off relay.

7. In a telephone system, a line, a plurality of trunks, a plunger for traversing the trunks and connecting the line with an idle one thereof, a magnet for drawing the plunger into position to close the connection, a line relay bridged on the line and controlling said magnet, a bridge-cut-off relay, a circuit for energizing said magnet and cut-off relay in series, said magnet provided with an armature having a finger adapted to open the springs of said cut-off relay, and a third relay, and said circuit including a third or non-talking conductor of any one of said trunks, depending on which one is in use, and including normally open contacts of said third relay, said relay provided with an energizing circuit closed during conversation.

8. In a telephone system, a plurality of automatic switches, trunks to be seized by said switches, and a master switch common to said automatic switches, said master switch provided with a notched wheel and a motor magnet and ratchet for operating the same, contacts operated by the notches on said wheel, a circuit for said magnet normally open at said contacts, an interrupter for said circuit operated by the said magnet, and a relay provided with normally open contacts connected in parallel with said first-mentioned contacts.

9. In a telephone system, a plurality of automatic switches, trunks to be seized by said switches, and a master switch common to said automatic switches, said master switch provided with a notched wheel and a motor magnet and ratchet for operating the same, contacts operated by the notches on said wheel, a circuit for said magnet normally open at said contacts, an interrupter for said circuit operated by the said magnet, a relay provided with normally open contacts connected in parallel with said first-mentioned contacts, and a wiper operated by said magnet and provided with a bank of contacts each representing a different trunk and controlling circuit through the winding of said relay.

10. In a telephone system, a pair of line conductors, a third conductor, a selector provided with a lamp signal, a supervisory relay controlling said lamp, and a slow-acting relay controlling said supervisory relay over said third conductor.

11. In a telephone system, a called line, a connector having two selecting motions for seizing said line and for setting up a talking circuit from the calling to the called line, a busy test circuit for the called line separate from the talking circuit, means for applying a busy potential to the said circuit when the called line is busy, automatic means responsive to said busy potential for releasing the connector if the called line is busy, and means for controlling said connector over two sides of the talking circuit in series by means of a varying number of impulses dependent upon the digit of the called number.

12. In a telephone system, calling and called lines, a connector responsive to the calling subscriber to seize the called line, and for setting up a talking circuit from the calling to the called line, a busy test circuit for the called line, means for applying a busy potential to said circuit when the called line is busy; automatic means operative to release the connector if the called subscriber hangs up his telephone ahead of the calling subscribed, and means for controlling the connector, over two sides of the talking circuit in series.

13. In a telephone system, subscribers' stations including calling mechanism, a plurality of trunk lines, two switches, one switch for selecting an idle trunk line independently of any operation of said calling mechanism, and thus extend a connection over said selected trunk to the second switch, a magnet for maintaining said first switch in contact with said trunk, means including a circuit extending from said second switch for controlling said magnet, and means for controlling said switches over two sides of a line circuit in series.

14. In a telephone system, a line, a plurality of trunks, an automatic switch, a plunger for traversing the trunks and connecting the line with an idle one thereof to extend connection to said automatic switch, a magnet for drawing the plunger into position to close connection, and means including a circuit extending from said switch for controlling said magnet.

15. In a telephone system, a line, a plurality of trunks, an automatic switch, a plunger for traversing the trunks and connecting the line with an idle one thereof to extend connection to said automatic switch, a magnet for drawing the plunger into position to close connection, means including a circuit extending from said switch for controlling said magnet, and means for controlling said switch over two sides of the line in series.

16. In a telephone system, a plurality of automatic switches, trunks to be seized by said switches, a master switch common to said automatic switches, a pair of normally open contacts, a short-circuit adapted to be closed around said contacts, means for initially closing said short-circuit to operate said master switch, and means for continuing the operation of said master switch through the medium of said contacts.

17. In a telephone system, a plurality of automatic switches, trunks to be seized by said switches, a master switch common to said automatic switches, a pair of normally open contacts, a short-circuit adapted to be closed around said contacts, means for initially closing said short-circuit to operate said master switch, means for continuing the operation of said master switch through the medium of said contacts, and means for controlling said switches over two sides of a line circuit in series.

18. In a telephone system, a plurality of automatic switches, trunks to be seized by said switches, a master switch common to said automatic switches, a motor magnet for operating said master switch, means comprising a pair of springs for initially operating said motor magnet, and independent means comprising a pair of springs for short circuiting said first pair for continuing said operation after the initial operation.

19. In a telephone system, a plurality of automatic switches, trunks to be seized by said switches, a master switch common to said automatic switches, a motor magnet for operating said master switch, a pair of springs and a relay for initially operating said motor magnet, and independent means comprising a pair of springs for short circuiting said first pair for continuing said operation after the initial operation.

20. In a telephone system, a plurality of lines, an automatic switch to automatically extend a connection over said lines, means for seizing said switch, a supervisory signal for said switch, means for displaying said signal when said switch is seized, and means for controlling said switch over two sides of a line circuit in series.

21. In a telephone system, a plurality of lines divided into groups, an automatic switch to automatically extend a connection over said lines, means for seizing said switch, a supervisory signal for said switch, means for displaying said signal when said switch is seized, and means for controlling said switch over two sides of a line circuit in series, said switch having motion in one plane to select groups and motion in an intersecting plane to find a line in a selected group.

22. In a telephone system, a line, a plurality of trunks, a plunger for traversing the trunks and connecting the line with an idle one thereof, a magnet for drawing the plunger into position to close the connection, a line relay bridged on the line and controlling said magnet, a bridge-cut-off relay, a circuit for energizing said magnet and cut-off relay in series, and means for controlling said line relay over two sides of the line in series.

23. In a telephone system, a line, a plurality of trunks, a plunger for traversing the trunks and connecting the line with an idle one thereof, a magnet for drawing the plunger into position to close the connection, a line relay bridged on the line and controlling said magnet, a bridge-cut-off relay, a circuit for energizing said magnet and cut-off relay in series, said magnet provided with an armature having a finger adapted to open the springs of said cut-off relay, and means for controlling said line relay over two sides of the line in series.

24. In a telephone system, a line, a plurality of trunks, a plunger for traversing the trunks and connecting the line with an idle one thereof, a magnet for drawing the plunger into position to close the connection, a line relay bridged on the line and controlling said magnet, a bridge-cut-off relay, a circuit for energizing said magnet and cut-off relay in series, said circuit including a trunk conductor, and means for controlling said line relay over two sides of the line in series.

25. In a telephone system, a line, a plurality of trunks, a plunger for traversing the trunks and connecting the line with an idle one thereof, a magnet for drawing the plunger into position to close the connection, a line relay bridged on the line and controlling said magnet, a bridge-cut-off relay, a circuit for energizing said magnet and cut-off relay in series, said circuit including a third or non-talking conductor of any one of said trunks, and means for controlling said line relay over two sides of the line in series.

26. In a telephone system, a line, a plurality of trunks, a plunger for traversing the trunks and connecting the line with an idle one thereof, a magnet for drawing the plunger into position to close the connection, a line relay bridged on the line and controlling said magnet, a bridge-cut-off relay, a circuit for energizing said magnet and cut-off relay in series, a third relay, said circuit including normally open contacts of said third relay, said relay provided with an energizing circuit closed during conversation, and means for controlling said line relay over two sides of the line in series.

27. In a telephone system, a line, a plurality of trunks, a plunger for traversing the trunks and connecting the line with an idle one thereof, a magnet for drawing the plunger into position to close the connection, a line relay bridged on the line and controlling said magnet, a bridge-cut-off relay, said magnet provided with an armature having a finger adapted to open the springs of said cut-off relay, and means for controlling said line relay over two sides of the line in series.

28. In a telephone system, a line, a plurality of trunks, a plunger for traversing the trunks and connecting the line with an idle one thereof, a magnet for drawing the plunger into position to close the connection, a line relay bridged on the line and controlling said magnet, a bridge-cut-off relay, a circuit for energizing said magnet and cut-off relay in series, said magnet provided with an armature having a finger adapted to open the springs of said cut-off relay, a third relay, said circuit including a third or non-talking conductor of any one of said trunks, depending on which one is in use, and including normally open contacts of said third relay, said relay provided with an energizing circuit closed during conversation, and means for controlling said line relay over two sides of the line in series.

29. In a telephone system, a plurality of automatic switches, trunks to be seized by said switches, and a master switch common to said automatic switches, said master switch provided with a notched wheel and a motor magnet and ratchet for operating the same, contacts operated by the notches on said wheel, a circuit for said magnet normally open at said contacts, an interrupter for said circuit operated by the said magnet, a relay provided with normally open contacts connected in parallel with said first-mentioned contacts, and means for controlling said automatic switches over two sides of a line circuit in series.

30. In a telephone system, a plurality of automatic switches, trunks to be seized by said switches, and a master switch common to said automatic switches, said master switch provided with a notched wheel and a motor magnet and ratchet for operating the same, contacts operated by the notches on said wheel, a circuit for said magnet normally open at said contacts, an interrupter for said circuit operated by the said magnet, a relay provided with normally open contacts connected in parallel with said first-mentioned contacts, a wiper operated by said magnet and provided with a bank of contacts each representing a different trunk and controlling circuit through the winding of said relay, and means for controlling said automatic switches over two sides of a line circuit in series.

31. In a telephone system, a line circuit, a pair of line conductors, a third conductor, a selector provided with a lamp signal, a supervisory relay controlling said lamp, a slow-acting relay controlling said supervisory relay over said third conductor, and means for controlling said selector over two sides of said line circuit in series.

32. In a telephone system, subscribers' lines, a connector switch, means controlled from any one of said lines for seizing said connector switch and for operating said switch to extend a talking circuit to any other one of said lines, a line relay for said connector switch energized over the two sides of the talking circuit in series to control the operation of said switch, a release magnet for said connector, and means for energizing said magnet when connection is made with a busy line to release said connector.

33. In a telephone system, a called line for establishing a talking circuit with the called line, a connector for seizing said line, means for controlling said connector over two sides of the talking circuit in series, a release magnet for said connector, an energizing circuit for said magnet, a side switch for said connector, a relay for controlling the operation of said side switch and likewise controlling the circuit of said release magnet, and means for energizing said release magnet when connection is made with a busy line in order to release said connector.

34. In a telephone system, a called line, a connector for seizing said line, a release magnet for said connector, a rotary magnet for controlling the operation of said switch, a slow acting relay controlling the circuit of said release magnet and adapted to remain energized while said rotary magnet is operating, and means for energizing said release magnet when connection is made with a busy line in order to release said connector.

35. In a telephone system, a called line for establishing a talking circuit with the called line, a connector for seizing said line, means for controlling said connector over two sides of the talking circuit in series, a release magnet, a side switch having a plurality of positions, a relay for controlling said side switch, a private wiper, and means for closing a circuit for said release magnet through said private wiper and said side switch while in second position, whereby said connector may be released when connection is made with a busy line.

36. In a telephone system, a called line, a connector for seizing said line, a release magnet for said connector, a side switch, a slow acting relay controlling the operation of said side switch, springs controlled by said slow acting relay for controlling the energizing circuit of said release magnet, said relay being slow acting to prevent its operation during the operation of the switch to thereby prevent a premature release, a private wiper, and means for closing a circuit for said release magnet over said private wiper and through said side switch when in second position, to thereby release said connector when connection is made with a busy line.

37. In a telephone system, a called line, a connector for seizing said line, a release magnet for said connector, a relay for controlling a circuit for said magnet, and means whereby said relay is normally short-circuited.

38. In a telephone system, a called line, a connector for seizing said line, a release magnet for said connector, a relay for controlling a circuit for said magnet, means whereby said relay is normally short-circuited, and means for removing said short-circuit when the called subscriber answers.

39. In a telephone system, a called line, a connector for seizing said line, a release magnet for said connector, an energizing circuit for said release magnet, said circuit including normally open and normally closed contacts, means for closing said normally open contacts and opening said normally closed contacts when the called subscriber answers, and means for again closing said normally closed contacts when the called subscriber replaces his receiver upon the hook to thereby release said connector.

40. In a telephone system, a called line, a connector for seizing said line, a release magnet for said connector, an energizing circuit for said magnet, said circuit including normally open and normally closed contacts, a slow acting relay controlling said normally open contacts, a second relay for controlling said normally closed contacts, means for energizing said second relay upon the response of the called subscriber to thereby open said normally closed contacts, and to energize said slow acting relay to thereby close said normally open contacts, and means for deenergizing said second relay when said subscriber replaces his receiver upon the hook to thereby again close said normally closed contacts, whereby the circuit for the release magnet is closed and the connector released.

41. In a telephone system, a plurality of subscribers' lines, means for establishing a connection between two of said lines, means for supplying ringing current to the called line, said means including a ringing relay, an energizing circuit for said ringing relay including a second relay, means for closing said circuit to energize said second relay but not said ringing relay, and means for thereafter increasing the flow of current in said circuit to thereby energize said ringing relay to apply ringing current to the called line.

42. In a telephone system, a plurality of subscribers' lines, means for establishing a connection between two of said lines, a ringer relay, a circuit for said relay including a second relay having sufficient resistance to prevent energization of said ringer relay, means for intermittently operating said second relay to thereby increase the flow of current through said ringer relay, and means controlled by said ringer relay for supplying ringing current to the called line.

43. In a telephone system, a calling line, a called line, a progressively movable trunking connector switch for connecting the two over a talking circuit, a busy test circuit for the called line separate from the talking circuit, means for operating said connector over two sides of the talking circuit in series to find the called line, means for supplying a busy test potential to said test circuit whenever the called line is busy, and means responsive to said potential for releasing said connector.

44. In a telephone system, a calling line, a called line, a progressively movable trunking connector switch for connecting the two over a talking circuit, a busy test circuit for the called line, means for operating said connector over two sides of the talking circuit in series to find the called line, means for applying a busy test potential to said test circuit whenever the called line is busy, means responsive to said potential for releasing said connector, and a busy signaling circuit for indicating to the calling line that the called line is busy.

45. In a telephone system, a calling line, a called line, a progressively movable trunking connector switch for connecting the two over a talking circuit, a busy test circuit for the called line, means for operating said connector over two sides of the talking circuit in series to find the called line, means for applying a busy test potential to said test circuit whenever the called line is busy, means responsive to said potential for releasing said connector, and a busy signaling circuit for indicating to the calling line that the called line is busy, said last circuit controlled by the release of the connector.

46. In a telephone system, a calling line, a called line, a progressively movable trunking connector switch for connecting the two over a talking circuit, a busy test circuit for the called line separate from the talking circuit, means for operating said connector over two sides of the talking circuit in series to find the called line, means for applying a busy test potential to said test circuit whenever the called line is busy, means responsive to said potential for releasing said connector, said last means comprising a release magnet, and an energizing circuit for said release magnet, said circuit comprising in turn a busy test circuit individual to the connector switch, said energizing circuit controlled by the release of the connector.

47. In a telephone system, a group of second selector switches, each operative in accordance with the second digit of the called number, trunks to be selected by said second selectors, a pair of relays common to said second selectors, operating to intermittently interrupt the flow of current through any selector until an idle trunk is found, each relay controlling the circuit of the other, a talking circuit, line relays for said selectors connected to said talking circuit, and means for controlling said relays over two sides of the talking circuit in series.

48. In a telephone system, a plurality of second selector switches, each operative in accordance with the second digit of the called number, a plurality of controlling relays common to all of said second selector switches, local circuits controlled by said relays, a talking circuit, line relays for said selectors connected to said talking circuit, and means for controlling said relays over two sides of the talking circuit in series.

49. In a telephone system, a switch having vertical and rotary motions, an operating magnet controlling the rotary motion of said switch, an energizing circuit for said magnet, a pair of relays controlling said energizing circuit, means for energzing one of said relays in order to energize the second of said relays, and means for opening said energizing circuit for said operating magnet by the energizing of said second relay while said first relay is energized.

50. In a telephone system, a vertical and rotary motion switch, a vertical operating magnet, a rotary operating magnet, a slow acting relay connected in series with said vertical operating magnet, a second relay controlled by said slow acting relay, and means for closing the energizing circuit for said rotary operating magnet by first energizing said relays and then deenergizing said slow acting relay.

51. In a telephone system, a switch having vertical and rotary motions, an operating magnet controlling the rotary motion of said switch, an energizing circuit for said magnet, a pair of relays controlling said energizing circuit, means for energizing one of said relays in order to energize the second of said relays, means for opening said energizing circuit for said operating magnet by the energizing of said second relay while said first relay is energized, and means for controlling the operation of said switch over two sides of the line.

52. In a telephone system, a vertical and rotary motion switch, a vertical operating magnet, a rotary operating magnet, a slow acting relay connected in series with said vertical operating magnet, a second relay controlled by said slow acting relay, means for closing the energizing circuit for said rotary operating magnet by first energizing said relays and then deenergizing said slow acting relay, and means for controlling the operation of said switch over two sides of the line circuit in series.

53. A telephone exchange system comprising telephone lines, automatic connectors less in number than said telephone lines, selectors less in number than the telephone lines, subscribers' individual switches corresponding in number to the telephone lines, subscribers' devices for closing the lines to control said individual switches and selectors and connectors by a varying number of impulses, line circuits by which the said individual switches and selectors and connectors are controlled, each line circuit including the two sides of a calling telephone line in series, said devices having provisions for determining the number of impulses necessary for each digit of the called number, and means for releasing said individual switches and selectors and connectors by the opening of the calling line.

54. A telephone exchange system comprising telephone lines, automatic connectors less in number than said telephone lines, selectors less in number than the telephone lines, provided with means having vertical step-by-step motion to select different operative levels, depending on the number called, and rotary step-by-step motion to connect with a line in the selected level, subscribers' individual switches corresponding in number to the telephone lines, subscribers' devices for closing the lines to control said individual switches and selectors and connectors, line circuits by which the said individual switches and selectors and connectors are controlled, each line circuit including the two sides of a calling telephone line in series, and means for releasing said individual switches and selectors and connectors by the opening of the calling line.

55. A telephone exchange system comprising a calling telephone line, a called telephone line, means including a plurality of selectors and a connector for extending connection from the calling line to the called line, calling mechanism requiring a separate manual operation thereof for each digit of the called number, operative to transmit suitable controlling current for one digit before the said mechanism is manually operated for the next digit, line circuits for controlling the selectors, and a line circuit for controlling the connector, each line circuit including said mechanism and the two sides of the calling line in series.

56. A telephone exchange system comprising telephone lines, automatic connectors less in number than said telephone lines, selectors less in number than the telephone lines, subscribers' individual switches corresponding in number to the telephone lines, subscribers' apparatus for closing the lines to control said individual switches and selectors and connectors, comprising a calling mechanism requiring a separate manual operation thereof for each digit of the called number, operative to transmit suitable controlling current for one digit before the said mechanism is manually operated for the next digit, line circuits by which the said individual switches and selectors and connectors are controlled, each line circuit including said mechanism and the two sides of a calling telephone line in series, and means for releasing said individual switches and selectors and connectors by the opening of the calling line.

57. A telephone exchange system comprising a calling telephone line, a called telephone line, calling mechanism requiring a separate manual operation thereof for each digit of the called number, operative to transmit suitable controlling current for one digit before the said mechanism is manually operated for the next digit, means including a plurality of selectors and a connector for extending connection from the calling line to the called line, provided with means having vertical motion to select different operative levels, depending on the number called, and rotary motion to connect with a line in the selected level, line circuits for controlling the selectors, and a line circuit for controlling the connector, each line circuit including said mechanism and the two sides of the calling line in series.

58. A telephone exchange system comprising a selector switch, another selector switch provided with a side switch, a line relay for said other switch, and means for energizing said line relay after said first switch extends connection to said other switch, adapted to maintain said line relay energized as long as the side switch of said other switch remains in first or second position, provided the line circuit to said first switch is kept closed at the same time.

59. In a telephone system, a connector switch; a side switch, a test wiper, a release magnet, and another electromagnet therefor; an energizing circuit for said release magnet controlled by said other electromagnet while the side switch is in second position, the said other electromagnet retaining its armature attracted while said test wiper is passing over busy contacts to prevent the release of said connector switch.

60. A telephone system comprising a series of switches each provided with a release relay, a subscriber's telephone and line, the first switch of said series being allotted to the line, means whereby when a subscriber removes his receiver the release relay of the first switch energizes and remains energized until the subscriber hangs up, means whereby the first switch may be mad to connect with the second switch of said series, and whereby the release relay of said second switch energizes as soon as connection is made with said second switch, which second release relay remains energized until the subscriber hangs up and means whereby said second switch may be made to connect with the third switch of said series, and whereby the release relay of said third switch then energizes and remains energized until the subscriber hangs up his receiver.

61. A telephone exchange system comprising a selector switch, another selector switch having a side switch, said other switch provided with means having vertical motion to select different operative levels depending upon the number called, and rotary motion to connect with a line in the selected level, a line relay for said other switch, and means for energizing said line relay after the first switch extends connection to said other switch adapted to maintain said line relay energized as long as the side switch of said other selector remains in first or second position, provided the line circuit to said first switch is kept closed at the same time.

62. In a telephone system, a connector switch for completing connection to a desired subscriber's line; a test wiper, a release magnet and another electromagnet therefor; an energizing circuit for said release magnet controlled by said other electromagnet, said other electromagnet retaining its armature attracted while said test wiper is passing over busy contacts to prevent the release of said switch.

63. In a telephone system, a plurality of selectors, a connector, release relays in each of said selectors, and means in said connector for maintaining all of said relays energized.

64. In an automatic telephone exchange trunking system, a calling subscriber's line and a called subscriber's line, a plurality of switches for establishing connection between said lines, a slow-acting relay in each of said switches, one of said switches adapted to supply the talking circuit with talking current, the said talking current supplying switch comprising means for maintaining all the said slow-acting relays energized 65. In an automatic telephone exchange trunking system, a calling subscriber's line and a called subscriber's line, means including a plurality of selector switches and a connector switch for connecting the two lines, a releasing mechanism for each switch and a releasing relay for controlling each releasing mechanism, parallel circuits for said release relays, and a line relay for the connector switch, said line relay adaptel to control the parallel circuits of all of said release relays after the two lines are connected.

66. In an automatic telephone exchange trunking system, a calling subscriber's line and a called subscriber's line, means including a plurality of switches for extending connection between the two lines in a step-by-step manner, a release mechanism for each switch, a slow-acting release relay for controlling each releasing mechanism, the slow-acting releasing relay of the last switch brought into the connection being adapted to control the circuit of the slow-acting release relays of all the preceding switches, the releasing relay of each switch adapted to become energized from the instant that this switch is brought into use until it is released, and means for maintaining the release relays of the preceding switches energized from the time such switches are brought into use until the final switch is brought into use.

67. In an automatic telephone exchange trunking system, a calling subscriber's line and a called subscriber's line, means including a plurality of selector switches and a connector switch for connecting the two lines, a releasing mechanism for each switch and a releasing relay for controlling each releasing mechanism, parallel circuits for said release relays, and a line relay for the connector switch, said line relay adapted to control the parallel circuits of all of said release relays after the two lines are connected, the releasing relay of each switch adapted to become energized from the instant that this switch is brought into use until it is released, and means outside the connector for maintaining the selector release relays energized from the time the selectors are brought into use until the connector is brought into use.

68. In an automatic telephone exchange trunking system, a calling line and a called line, a plurality of switches for connecting the calling line with the called line, including a switch individual to the calling line, line bank springs for the said individual line switch included in the connecting line circuit, and automatic means whereby if said springs are separated all of the switches are released.

69. In an automatic telephone exchange trunking system, a calling subscriber's line and a called subscriber's line, a series of switches for trunking the calling line into connection with the called line, a private wiper for one of said switches, a trunk line accessible to said last mentioned switch and included in the connection, and automatic means whereby if the private wiper is disconnected from the said trunk the said switch and all switches between said switch and the called subscriber's line will be released.

70. In an automatic telephone exchange trunking system, a calling subscriber's line and a called subscriber's line, a series of automatic switches for trunking the calling subscriber's line into connection with the called subscriber's line, a private wiper for one of said switches, a trunk line accessible to said last mentioned switch and included in the connection, and automatic means whereby if the private wiper is disconnected from the said trunk the said switch and a switch at each side thereof are released.

71. In a telephone system, a connector provided with an element having vertical and rotary motion to find the called subscriber, release mechanism for restoring the connector to normal position, and a double-wound line relay having a battery normally connected in series between the windings thereof and operative to control the vertical and rotary motion and the release of said connector.

72. In a telephone system, a plurality of trunks, an automatic trunking switch provided with an element having vertical and rotary step-by-step motion to find an idle trunk, and a double-wound line relay having a battery normally connected in series between the windings thereof and operative to control the vertical motion and start the rotary motion.

73. In a telephone system, a plurality of switches, each provided with a private wiper, the first switch adapted to establish connection with the second switch, the second switch adapted to establish connection with the third switch, the first switch adapted to establish a guarding potential at the private wiper thereof until the second switch is brought into use, and after being thus brought into use the second switch serving to provide a guarding potential at the private wiper of the first switch and also at its own private wiper until the third switch is brought into use, and the third switch when brought into use adapted to provide a guarding potential at its own private wiper and also at the private wipers of the first and second switch, as set forth.

74. In a telephone system, a selector, means for producing impulses for operating said selector, a line relay therefor responsive to said impulses, a pair of relays controlled by said line relay, said pair of relays being relatively slow acting, whereby they are not operated by the impulses for operating said line relay, a release circuit controlled by one of said pair of relays, a private magnet controlled by the other of said pair of relays, and a side switch controlled by said private magnet.

75. In a telephone system, a subscriber's line, a selector switch, means for producing impulses for operating said switch, a double wound line relay normally bridged across said line and responsive to said impulses, another relay controlled by said line relay, said other relay being relatively slow acting, whereby it is not operated by the im-

0, TELEPHONY,

8 pulses for operating said line relay, and a battery bridged between the double winding of the line relay for supplying the operating current thereto.

76. In a telephone system, a selector switch, means for producing impulses for operating said switch, a line relay therefor responsive to said impulses, another relay controlled by said line relay, said other relay being relatively slow acting, whereby it is not operated by the impulses for operating said line relay, and another selector switch, said other switch having release mechanism controlled by said other relay of said first mentioned switch while said first mentioned switch is in normal position and while the same is operating responsive to impulses as set forth.

77. In an automatic telephone exchange trunking system, a pair of selector switches, a trunk line running from one of said switches to the other of said switches and comprising a trunk release conductor, and means whereby the said other switch may, when the trunk is seized by the first switch and before the other switch is operated, instantly put a guarding potential on said trunk release conductor.

78. In an automatic telephone exchange trunking system, a plurality of selectors and a connector, means whereby a line circuit may be established through all of the said selectors to the said connector, said line circuit comprising a trunk release conductor, and means whereby the connector may establish a guarding potential in said trunk release conductor at the instant that the line circuit is completed.

79. In an automatic telephone exchange trunking system, a first selector, a second selector and a connector, a trunk line running between the first selector and the second connector and comprising a trunk release conductor, a trunk line running between the second selector and the connector and comprising a trunk release conductor, and means in said connector whereby as soon as the last trunk line is seized the guarding potential is instantly established in all of the said trunk release conductors.

80. In an automatic telephone exchange trunking system, a first selector switch, a line relay and a slow acting relay therefor, a second selector switch, a line relay and a slow acting relay therefor, a connector switch, a trunk line running from said first selector switch to said second selector switch and adapted to be seized by the former, a trunk line running from said second selector switch to the connector switch and adapted to be seized by the former, means in said first selector switch for maintaining said slow acting relay therefor energized until the first trunk line is seized, means in said second selector switch for then maintaining the said slow acting relay therefor and also the said slow acting relay for said first selector switch energized until the second trunk line is seized, and means in said connector switch for then maintaining both of said slow acting relays energized.

81. In an automatic telephone exchange trunking system, a first selector switch comprising a line relay and a slow acting relay, a second selector switch comprising a line relay and a slow acting relay, a connector switch comprising a line relay and a slow acting relay, a trunk line extending from said first selector switch to said second selector switch, the first selector switch being adapted to seize said trunk line to establish connection with said second selector switch, a trunk line extending from said second selector switch to said connector switch, said second selector switch being adapted to seize the second trunk line, said first selector switch comprising means for maintaining its slow acting relay energized after an operation has begun and until the connection is established with said second selector switch, said second selector switch comprising means for maintaining its own slow acting relay and the slow acting relay of said first selector switch energized after said first selector switch establishes connection with said second selector switch, and until connection is made with said connector switch, said connector switch comprising means for maintaining all of the aforesaid slow acting relays energized after said second selector switch establishes connection with said connector switch.

82. In an automatic telephone exchange trunking system, a series of switches, two pairs of line bank springs for the first one of said switches together with automatic means, whereby if either or both of said pairs of springs are separated all the switches are released.

83. In an automatic telephone exchange trunking system, a calling subscriber's line and a called subscriber's line, a series of switches for trunking the calling subscriber's line into connection with the called subscriber's line, two trunk connecting springs or wipers allotted to the second switch of said series, together with automatic means whereby if either or both of said springs are separated from the trunk line all of the switches are released.

84. In an automatic telephone exchange trunking system, a calling subscriber's line and a called subscriber's line, a series of switches for trunking the calling line into connection with the called line, two trunk connecting springs or wipers allotted to the third switch of said series together with automatic means whereby if either or both of said springs are separated from the trunk line all of the switches are released.

85. In a telephone system, the combination of a connector switch provided with a release magnet, a shaft for said switch, a pair of springs controlled by said shaft, a battery, said shaft controlling the connection between said release magnet and the non-grounded terminal of said battery at a point between the shaft controlled springs, and means for supplying current over the subscribers' lines to operate said connector switch substantially as set forth.

86. In a telephone system, a selector switch having a release magnet, slow acting relay springs and off normal springs, a battery, a normally closed connection from said magnet to the ground terminal of said battery through said slow acting relay springs, a normally open connection from said magnet to the non-grounded terminal of said battery through said off normal springs, whereby if the switch shaft is accidentally raised off normal the selector switch will automatically release, and means for supplying operating and talking current from the central station.

87. In a telephone system, the combination of a series of switches each provided with a release relay, a subscriber's telephone and line, means whereby when a subscriber removes his receiver the release relay of the first switch of said series energizes and remains energized until the subscriber hangs up, means whereby said first switch may be made to connect with the second switch of said series, and whereby the release relay of said second switch energizes as soon as connection is made with said second switch, which second release relay remains energized until the subscriber hangs up, means whereby said second switch may be made to connect with the third switch of said series, and whereby the release relay of said third switch then energizes and remains energized until the subscriber hangs up, and means for supplying operating and talking current from the central station.

88. In an automatic telephone exchange trunking system, a calling subscriber's line and a called subscriber's line each including a pair of talking conductors, means including a plurality of switches for extending connection between the two lines in a step by step manner, a line relay for each switch, a circuit for each line relay including said talking conductors of the calling line in series, a release mechanism for each switch, a releasing relay for controlling each releasing mechanism, the releasing relay of the last switch brought into the connection being adapted to directly control the circuit of the release relay of all the preceding switches, whereby all such switches are simultaneously released.

89. In a telephone system, a switch provided with a release magnet, releasing means operated by said magnet, a circuit for said magnet, two normally closed switch points in said circuit, a slow relay controlling one switch point, a quick relay controlling the other switch point, means for supplying intermittent current to keep the slow relay energized continuously during operation of the switch to keep the circuit open, means for supplying steady current to keep the quick relay energized during telephonic conversation through said switch, to keep the said circuit open, and means for effecting a deenergizing of the quick relay to release the switch.

90. A telephone system comprising a connector switch, a line relay therefor, a release magnet, means whereby if the line relay is deenergized momentarily the release magnet is prevented from energizing, and means whereby if the line relay deenergizes for a greater length of time the release magnet energizes and releases the said connector switch, the said means comprising a slow acting release relay, a circuit for said release relay extending through contacts on said line relay, and a circuit for said magnet extending through contacts on both said relays.

91. In a telephone system, a connector provided with a release magnet, and having quick and slow acting relays controlling said magnet, the said quick acting relay controlling the circuit of said slow acting relay, contacts on said quick acting relay for holding the circuit through said magnet open during conversation, and contacts on said slow acting relay for holding said magnet circuit open while operating impulses are being transmitted.

92. In a telephone system, an automatic switch adapted for directive control in accordance with a series of impulses corresponding to a digit in a subscriber's number, a quick acting relay responsive to individual impulses of said series, a slow acting relay controlled by said line relay but irresponsive to impulses, a release magnet, a circuit for said magnet, contacts on said slow acting relay for holding said circuit open during the transmission of impulses to said switch, and contacts on said quick acting relay for holding said circuit open after the switch is operated.

93. In a telephone system, a temporarily established connection extending from a calling line through an individual switch and a plurality of directive switches, multiple test contacts individual to the calling line and a circuit closed at the first one of said directive switches for establishing a busy potential on said test contacts.

94. In a telephone system, a temporarily established connection between a calling and a called line including a plurality of switches controlled over the two sides of the calling line in series, multiple test contacts individual to the calling line, and a circuit closed at the second one of said switches and extending back through the first of said switches to said test contacts for maintaining a busy potential on said test contacts.

95. In a telephone system, a temporarily established connection between a calling and a called line including in serial relation a plurality of trunking switches and a final connector switch, multiple test contacts individual to said connector switch, multiple test contacts individual to one of said trunking switches, and relay controlled mechanism in said final connector for maintaining a busy potential on all of said test contacts.

96. In a telephone system, a temporarily established connection including a calling line and a plurality of serially related automatic switching mechanisms, a first circuit including the calling line and extending forward to the last one of said mechanisms, a second circuit extending from the last of said mechanisms back thru a plurality of the other mechanisms, a relay in the last mechanism controlled over the first circuit for holding the second circuit closed, a release relay in each mechanism of said plurality maintained energized over said second circuit, and switch restoring means controlled by each release relay.

97. In a telephone system, a temporarily established connection including a train of serially related automatic switches, two circuits extending from the second of said switches through all the intermediate switches to the last of said switches, a relay in the last switch energized over the first circuit to maintain the second circuit closed, and release mechanism in each switch except the first controlled over said second circuit.

98. In a telephone system, a temporarily established connection including a train of serially related automatic switches, two circuits extending from the second of said switches through all the intermediate switches to the last of said switches, a relay in the last switch energized over the first circuit to maintain the second circuit closed, and release mechanism in each switch except the first responsive to the opening of said second circuit.

99. In a telephone system, a temporarily established connection including a train of serially related automatic switches, two circuits extending from the second of said switches through all the intermediate switches to the last of said switches, a relay in the last switch energized over the first circuit to maintain the second circuit closed, a release magnet in each switch, and a relay in each switch except the first maintained energized over said second circuit to prevent the operation of the associated release magnet.

100. In a telephone system, means including a plurality of serially related trunk lines for connecting a calling and a called line, each of said trunk lines terminating in an automatic switch, a release trunk conductor included in each trunk line, means for successively operating said switches, and relay mechanism in each switch for grounding the incoming release trunk conductor when the switch is seized and for opening such ground connection when the connection is extended to the next switch.

101. In a telephone system, means including a plurality of serially related trunk lines for connecting a calling and a called line, each of said trunk lines terminating in an automatic switch, a release trunk conductor included in each trunk line, means for successively operating said switches, and relay mechanism in each switch for connecting a busy potential to the incoming release trunk conductor when the switch is seized and for opening such connection when the connection is extended to the next switch.

102. In a telephone system, a plurality of serially related trunk lines for use in setting up a talking circuit, each of said trunk lines terminating in an automatic switch, a release trunk conductor included in each trunk line, means for successively operating said switches, means in each switch for connecting a source of current to the incoming release trunk conductor when the switch is seized, and means in each switch except the last effective as soon as such switch is operated for connecting the incoming release trunk conductor to the release trunk conductor of the next trunk line.

103. In a telephone system, means including a train of serially related automatic trunking switches for connecting a calling and a called line, said switches each having primary and secondary selecting movements, a trunk line extending from each switch except the last to the next in the series, a slow acting release relay in each switch, a second slow acting relay in each switch for controlling the changeover from primary to secondary movement, and a line relay in each switch controlled over the two talking conductors of the associated trunk in series for controlling the associated slow acting relays.

104. In a telephone system, a train of automatic switches for connecting a calling and a called line, primary and secondary operating magnets and a release magnet in each switch, a slow acting release relay in each switch, a slow acting changeover control relay in each switch, and a line relay in each switch controlling both the associated slow acting relays.

105. In a telephone system, means including a plurality of serially related automatic switches for extending a connection to a called line, primary and secondary operating magnets and a release magnet in each switch, means for transmitting a series of impulses to each of the switches in turn to build up the connection, a line relay in each switch responsive to individual impulses for controlling the associated primary magnet, a slow acting relay in each switch irresponsive to individual impulses and controlling the associated release magnet, and a second slow acting relay in each switch responsive to the cessation of a series of impulses for controlling the associated secondary magnet.

106. In a telephone system, an automatic switch having directive primary and automatic trunk selecting secondary movements, primary and secondary magnets for said switch, a circuit including a conductor over which impulses are transmitted to said primary magnet, a relay also responsive to impulses transmitted over said conductor, said relay being slow acting so as to hold its armature attracted during a series of impulses, contacts closed responsive to the deenergization of said relay following a series of impulses for initiating the automatic operation of said secondary magnet, and a talking trunk extending through said switch and comprising conductors separate from the conductors included in the circuits over which said magnets are controlled by said relays.

107. In an automatic switch, primary and secondary operating magnets, an individual line relay, a circuit for energizing said relay when the switch is taken for use, means for producing interruptions in said circuit to cause said relay to transmit a series of impulses direct to said primary magnet, a slow acting relay irresponsive when the line relay is energized but responsive to said series of impulses to maintain its armature attracted, and a circuit for said secondary magnet controlled my said slow relay.

108. In a selector switch, primary and secondary operating magnets, a circuit over which impulses are transmitted to said primary magnet, a low resistance relay included in said circuit in series with said primary magnet, said relay being slow acting so as to remain in energized position during a series of impulses, and a circuit for said secondary magnet completed on the deenergization of said slow acting relay.

109. In a selector switch, primary and secondary operating magnets, a circuit over which impulses are transmitted to said primary magnet, a low resistance relay included in said circuit in series with said primary magnet, said relay being slow acting so as to remain in energized position during a series of impulses, a circuit for said secondary magnet, and contacts for closing said circuit responsive to the deenergization of said slow acting relay.

110. In a selector switch, an individual line relay, a slow acting release relay and a slow acting changeover control relay both controlled by said line relay, a primary operating magnet controlled by said line and release relays jointly, a secondary operating magnet controlled by said changeover control relay, a release magnet controlled by said release relay, and local circuits independent of the talking conductors over which said magnets are controlled as set forth.

111. In a selector switch, an individual line relay, a slow acting release relay and a slow acting changeover control relay both controlled by said line relay, a primary operating magnet controlled by said line relay, a secondary operating magnet controlled by said changeover control relay, and a release magnet controlled by said release relay independent of the said changeover control relay.

112. In a selector switch, primary and secondary operating magnets and a release magnet, a line relay for directively controlling said primary magnet, means for automatically operating said secondary magnet, a slow acting release relay controlled by said line relay to hold the circuit of said release magnet open while the switch is operating, and a second slow acting relay controlled by said line relay during the operation of the primary magnet to delay the operation of said secondary magnet until the operation of the primary magnet is completed.

113. In a selector switch, a directively controlled primary operating magnet, an automatically controlled secondary operating magnet, a release magnet, a circuit for said release magnet, a line relay controlling said primary magnet, a slow acting relay controlled by said line relay to hold open the circuit of said release magnet, a second slow acting relay maintained energized by the said line relay while the primary magnet is operating to delay the automatic operation of said secondary magnet, and a circuit for said magnet closed responsive to the deenergization of said second slow relay.

114. In a telephone system, a selector switch having primary and secondary movements, a trunk line including two metallic talking conductors terminating in said switch, a line relay in said switch controlled over the two sides of said trunk line in series, a slow acting release relay in said switch controlled by said line relay, a second slow acting relay also controlled by said line relay for effecting the changeover from primary to secondary movement, and circuits independent of said talking conductors over

18 which the said slow relays are controlled by said line relay as set forth.

115. In a telephone system, a selector switch having primary and secondary movements, a trunk line terminating in said switch, a line relay in said switch energized over the two talking conductors of said trunk line in series when the same is taken for use, means for producing momentary interruptions in the circuit of said line relay to cause momentary deenergizations thereof, a slow acting release relay controlled by said line relay but irresponsive to said momentary deenergizations, a second slow acting relay responsive to a series of said deenergizations for controlling the changeover from primary to secondary movement, and circuits excluding said talking conductors over which the said slow relays are controlled by said line relay as set forth.

116. In an automatic switch, an individual line relay, directively controlled primary and secondary operating magnets, a release magnet, contacts on said line relay for transmitting impulses direct to either of said operating magnets, mechanism for shifting the control of said contacts from one of said operating magnets to the other, and two slow acting relays controlled by said line relay, one for controlling said release magnet and the other for controlling said shifting mechanism.

117. In an automatic switch, primary and secondary operating magnets, a release magnet, a release magnet circuit, a line relay, a circuit extending from said line relay and including a conductor common to said operating magnets, switching means in said second circuit for rendering the same effective to control said operating magnets successively, and two slow acting relays controlled by said line relay, one for holding open the circuit of said release magnet and the other for controlling said switching means.

118. In an automatic telephone system, a connector switch having primary and secondary operating magnets, a circuit including a conductor extending to said primary magnet, a line relay for transmitting a series of impulses over said conductor to operate said primary magnet, a relay also responsive to impulses transmitted over said conductor, said relay being slow acting so as to hold its armature attracted during said series of impulses, a circuit over which said line relay transmits impulses to said secondary magnet, and circuit changing means controlled by said slow relay for causing the second series of impulses to be transmitted by the line relay over the said secondary magnet circuit.

119. In an automatic switch, a line relay, a slow acting release relay controlled by said line relay, a release magnet, a pair of off normal springs, and a circuit for said release magnet including said off normal springs and contact springs on each of said relays.

120. In an automatic switch, a line relay having front and back contacts, a slow acting relay controlled at the front contact of said line relay, a release magnet for mechanically controlling the restoration of the switch, a circuit for said magnet including the back contact of said line relay, and contacts on said slow relay included in the circuit of said magnet.

121. In an automatic switch, a line relay having front and back contacts, a slow acting relay controlled at the front contact of said line relay, a release magnet, a circuit for said magnet including the back contact of said line relay, contacts on said slow relay included in the circuit of said magnet, and a pair of off normal contacts also included in the circuit of said magnet.

122. In an automatic switch, a line relay, an operating magnet, a release magnet, circuits for said magnets, a pair of contacts on said line relay common to said circuits and a slow acting relay controlled by said line relay for switching said contacts from one circuit to the other.

123. In an automatic switch, a line relay having front and back contacts, an operating magnet and a release magnet both controlled at the back contact of said relay, and a slow acting relay controlled at the front contact of said relay for shifting the control of said back contact from one of said magnets to the other.

124. In an automatic switch, a line relay, an operating magnet, a release magnet, circuits for said magnets, a pair of contacts on said line relay common to said circuits, a slow acting relay controlled by said line relay for switching said contacts from one circuit to the other, a second operating magnet, and a second slow acting relay connected to the circuit of said first operating magnet for controlling said second operating magnet.

125. In a telephone system, first selectors, second selectors, connectors, multiple test contacts individual to each second selector and accessible to said first selectors, multiple test contacts individual to each connector and accessible to said second selectors, means for setting up a temporary connection including a switch of each class, and means for supplying a busy potential from the connector in use to its own individual test contacts and also to those individual to the second selector in use.

126. In a telephone system, first selectors, second selectors, connectors, multiple test contacts individual to each second selector and accessible to said first selectors, multiple test contacts individual to each connector and accessible to said second selectors, means for setting up a temporary connection including a switch of each class, means in the connector in use for placing a busy potential on its own individual test contacts, and a conductor temporarily connecting the test contacts of the connector in use with those of the second selector in use, whereby the latter test contacts have a busy potential placed on them also.

127. In a telephone system, first selectors, second selectors, connectors, multiple test contacts individual to each second selector and accessible to said first selectors, multiple test contacts individual to each connector and accessible to said second selectors, means for setting up a temporary connection including a switch of each class, means in the connector in use for placing a busy potential on its own individual test contacts, a conductor temporarily connecting the test contacts of the connector in use with those of the second selector in use, whereby the latter test contacts have a busy potential placed on them also, release relays in the operated first and second selectors, a test wiper in the operated first selector connecting its release relay with one of the multiple test contacts individual to the operated second selector, and a test wiper in the operated second selector connecting its release relay to one of the test contacts individual to the operated connector.

128. In a telephone system, three serially related trunk lines each terminating in an automatic switch, release trunk conductors included in the trunk lines extending to the second and third switches, a test wiper in the first switch engaging the release trunk conductor extending to the second switch, a test wiper in the second switch engaging the release trunk conductor extending to the third switch, a connection in the second switch between its test wiper and the release trunk conductor terminating in such switch, whereby said release trunk conductors are connected together, means in the third switch for connecting the release trunk conductor associated therewith to one terminal of the exchange battery, and release relays in the first and second switches connected between the respective test wipers of such switches and the other terminal of the battery.

129. In a selector switch, a primary operating magnet, a line relay, contacts on said line relay for transmitting impulses to said magnet, a second relay having normally open contacts maintained energized responsive to momentary deenergizations of said line relay to hold said normally open contacts closed while impulses are being transmitted to said primary magnet, a secondary operating magnet, and means responsive to the opening of the said contacts on said second relay for closing an energizing circuit for said secondary magnet.

130. In an automatic switch, an operating magnet, a release magnet, a line relay for transmitting a series of impulses to said operating magnet, a slow acting relay having normally closed contacts maintained energized by said line relay to hold said contacts open during the transmission of impulses, and a circuit for said release magnet closed during the transmission of a plurality of impulses of said series with the sole exception of a break at said contacts.

131. In a selector switch, primary and secondary operating magnets and a release magnet, a line relay, two slow acting relays, a circuit for the first slow relay controlled at the front contact of said line relay, a circuit for the second slow relay controlled at the back contact of said line relay, a circuit for said primary magnet including a normally open contact of said first slow relay and the said line relay contacts which control the second slow relay, a circuit for said release magnet including a normally closed contact of said first slow relay, a circuit for said secondary magnet, and means including said second slow relay for controlling said secondary magnet circuit.

132. In a telephone system, a train of automatic directive switches for connecting a calling and called line, a line relay in each switch for controlling the operation thereof, a circuit for the line relay of the first switch including the two sides of the calling line in series, circuits for the line relays of the other switches, each circuit including the line wipers of the preceding switch or switches and the two sides of the calling line in series, means in each switch except the last for disconnecting the associated line relay after the switch is operated, a release relay in each switch held energized to prevent restoration, and means controlled by the line relay of the last switch for maintaining all of said release relays energized.

133. In a telephone system, a temporarily established connection including a trunk line, a selector in which said trunk line terminates, another selector and a connector, a first circuit including a conductor of said trunk line and extending forward through both selectors to said connector, a second circuit extending backward from said connector through the second mentioned selector to the first mentioned selector, a relay in the connector energized over said first circuit to hold the second circuit closed, a release relay in each selector maintained energized over said second circuit, and switch restoring means controlled by each release relay.

Signed by me at London, England, this 2nd day of June, 1922.

EDWARD A. MELLINGER.